United States Patent

Huemke et al.

Patent Number: 5,446,084
Date of Patent: Aug. 29, 1995

[54] SYNTHETIC RESINS

[75] Inventors: Klaus Huemke, Friedelsheim; Gerhard Hoffmann, Otterstadt; Dieter Faul, Duerkheim, all of Germany

[73] Assignee: BASF Lacke+ Farben AG, Muenster, Germany

[21] Appl. No.: 27,942

[22] Filed: Mar. 8, 1993

[30] Foreign Application Priority Data

Mar. 11, 1992 [DE] Germany ............. 42 07 653.6

[51] Int. Cl.⁶ ............................................. C08L 51/00
[52] U.S. Cl. ................................. 524/504; 523/201; 525/55; 525/65; 525/66; 525/67; 525/69; 525/70; 525/902
[58] Field of Search ............. 524/504; 523/201; 525/902, 55, 65, 66, 67, 69, 70

[56] References Cited

U.S. PATENT DOCUMENTS

| | | | |
|---|---|---|---|
| 4,297,261 | 10/1981 | Jozwiak, Jr. | 260/29.7 |
| 4,972,000 | 11/1990 | Kawashima et al. | 521/54 |
| 4,981,901 | 1/1991 | Noda et al. | 524/504 |
| 5,030,666 | 7/1991 | Kowalski et al. | 523/201 |
| 5,096,555 | 3/1992 | Schupp et al. | 204/181.7 |
| 5,157,084 | 10/1992 | Lee et al. | 525/301 |
| 5,206,299 | 4/1993 | Oshima et al. | 525/305 |
| 5,212,251 | 5/1993 | Lorah et al. | 525/279 |

FOREIGN PATENT DOCUMENTS

| | | |
|---|---|---|
| 621399 | 3/1990 | Australia . |
| 342042 | 11/1989 | European Pat. Off. . |
| 442533 | 8/1991 | European Pat. Off. . |
| 3830626 | 3/1990 | Germany . |

OTHER PUBLICATIONS

File Supplier PAJ/JPO & JP 3006269 (abstract), Jan. 11, 1991, Honny Chem Ind.
File Supplier PAJ/JPO & JP 3239770 (abstract), Oct. 25, 1991, Kansai paint.
File Supplier PAJ/JPO & JP 63169398 (abstract) Jul. 13, 1988, Nippon paint.
Derwent Publications Ltd, AN 92-394642 & JP 4293973 (abstract) Oct. 19, 1992, Nippon paint.

*Primary Examiner*—Paul R. Michl
*Assistant Examiner*—Edward Cain
*Attorney, Agent, or Firm*—Keil & Weinkauf

[57] ABSTRACT

Synthetic resins contain, as essential components,

A) from 20 to 95% by weight of a crosslinkable binder selected from the group consisting of the polymers, polyadducts or polycondensates having reactive centers in the form of hydroxyl, thio, primary and/or secondary amino groups and/or hydrophilic centers in the form of ammonium, sulfonium and/or phosphonium groups and B) from 5 to 80% by weight of polymers consisting of a core and one or more shells and furthermore C) from 0 to 10% by weight of one or more crosslinking agents and D) from 0 to 10% by weight of a pigment formulation consisting of one or more pigments and a resin having surfactant properties and E) from 0 to 10% by weight of additives and/or assistants.

5 Claims, No Drawings

SYNTHETIC RESINS

The present invention relates to synthetic resins which contain, as essential components, A) from 20 to 95% by weight of crosslinkable binders selected from the group consisting of the polymers, polyadducts and polycondensates having reactive centers in the form of hydroxyl, thio, primary amino and/or secondary amino groups and/or hydrophilic centers in the form of ammonium, sulfonium and/or phosphonium groups and B) from 5 to 80% by weight of polymers composed of a core and one or more shells and furthermore C) from 0 to 50% by weight of one or more crosslinking agents and D) from 0 to 50% by weight of a pigment formulation consisting of one or more pigments and a resin having surfactant properties and E) from 0 to 10% by weight of additives and/or assistants.

The present invention furthermore relates to a process for the preparation of these synthetic resins and to their use in electrocoating finishes.

The cathodic electrocoating process is being more and more frequently used for coating metal parts, in particular in the automotive industry. Cathodic synthetic resins which protect the coated articles from corrosion are required for this purpose. At the same time, the coatings obtained should be flexible so that they are no damaged by impacts.

Electrocoating resins usually consist of a binder and various additives which influence the properties of the coatings obtainable from the resins.

Acrylate-based graft copolymers are disclosed in, for example, DE-A1-38 30 626. Graft copolymers whose main and side chains have different polarities are also described, for example in EP-A2-342 042.

It is an object of the present invention to provide synthetic resins from which it is possible to produce coatings which are impact-resistant, or offer good corrosion protection and at the same time have good leveling properties as well as adhering firmly to subsequent coats.

We have found that this object is achieved by the synthetic resins defined at the outset.

Component (A)

According to the invention, the synthetic resins contain, as component (A), a crosslinkable binder or a mixture of different binders of this type. The binder content is in general from 20 to 95, preferably from 30 to 85%, by weight.

The basic building blocks of the binders which are suitable as component (A) are polymers, polycondensates or polyadducts which contain reactive centers in the form of hydroxyl, thio or primary or secondary amino groups. Via these reactive centers, the binders can, for example, become water-dispersible through protonation or be crosslinked by reaction with a crosslinking agent (component (C)). The average molecular weights $M_w$ of the basic building blocks are in general from 200 to 5,000, preferably from 250 to 3,000, the content of reactive centers being in general from 1.5 to 3.0, preferably from 1.8 to 2.5, equivalents per molecule. Examples of suitable materials are polyesters, alkyd resins, polyethers, polyacrylates, polyurethanes and polyepoxides. These basic building blocks may additionally be reacted with amines, alcohols, thiols or mixtures of these compounds. Suitable polyesters are those of aliphatic and/or aromatic dicarboxylic acids of 4 to 10 carbon atoms and polyhydric alcohols or thiols. Suitable alkyd resins have a similar composition but additionally contain one or more monocarboxylic acids, for example fatty acids. Alkyd resins which contain glycidyl esters of branched carboxylic acids may also be used. Aliphatic or araliphatic polyethers having reactive centers may likewise be used. They can advantageously be obtained by reacting dihydric and/or polyhydric alcohols with ethylene oxide and/or propylene oxide. The group consisting of the polymers includes polyacrylates which can be prepared by copolymerization of hydroxyl- or amino-containing monomers or of a mixture of different monomers of this type with other unsaturated monomers, such as aminoacrylate and aminomethacrylate resins. It is also possible to polymerize acrylates carrying epoxy groups, such as glycidyl methacrylate, and to derivatize the polymers by reaction with amines. Suitable polycondensates are, for example, condensates of polycarboxylic acids with polyamines. Reaction products of dimerized or trimerized fatty acids and amines, such as ethylenediamine, 1,2- and 1,3-diaminopropane, diethylenetriamine, dipropylenetriamine and triethylenetetramine, are suitable provided that they contain the required reactive centers. Polyurethanes obtained from aliphatic and/or aromatic diisocyanates and aliphatic diols have likewise proven suitable, provided that they have the required reactive centers.

Preferred binders are those whose parent structure is based on epoxy resins.

It is possible to use epoxy resins which are reaction products of polyhydric phenols with an epihalohydrin, and the molecular weight can be controlled by means of the ratio of phenol to epihalohydrin. Examples of such polyhydric phenols are resorcinol, hydroquinone, 2,2-di-(4-hydroxyphenyl)-propane (bisphenol A), p,p'-dihydroxybenzophenone, p,p'-dihydroxybiphenyl, 1,1-di-(4-hydroxyphenyl)-ethane, bis-(2-hydroxynaphthyl)-methane, 1,5-dihydroxynaphthylene and novolaks. Bisphenol A is preferably used. The preferred epihalohydrin is epichlorohydrin. In addition to the epoxy resins obtained from polyhydric phenols and an epihalohydrin, polyglycidyl ethers of polyhydric alcohols, such as ethylene glycol, diethylene glycol, triethylene glycol, 1,2-propylene glycol, 1,3-propanediol, 1,4-butanediol, 1,5-pentanediol, 1,6-hexanediol, 1,2,6-hexantriol, glycerol or 2,2-bis-(4-hydroxycyclohexyl)-propane, may be used.

Very particularly preferably, epoxy resins which are diglycidyl ethers of bisphenol A are modified with polyhydric phenols, in particular bisphenol A.

The epoxy resins can be reacted with saturated or unsaturated primary and/or secondary amines or a mixture of different amines. The amines include alkylamine, alkylalkanolamines, polyoxyalkylenepolyamines and polyhydric polyolefinamines.

Another possible method for modifying the epoxy resins is to react them with secondary amines which contain blocked primary amino groups, such as methyl isobutyl ketimines.

If desired, the epoxy resins modified with amines can be subjected to a chain-extending reaction with saturated or unsaturated polycarboxylic acids, for example with sebacic acid or with a dimeric fatty acid. Monocarboxylic acids, such as stearic acid or a fatty acid, may also be used.

The binders generally have an average molecular weight from about 200 to about 20,000. They may carry self-crosslinking groups, which can be introduced into the resin, for example, by reaction with half-blocked isocyanates. Synthetic resins whose binders (A) are not self-crosslinking furthermore contain a crosslinking component (C).

Component (B)

According to the invention, the synthetic resins contain, as component (B), a polymer which consists of a core and one or more shells. It is also possible to use a mixture of different polymers of this type. As a rule, the amount of component (B) in the synthetic resins is from 5 to 80, preferably from 5 to 30%, by weight. In general, the polymers have one or two shells. However, they may also consist of more shells but generally do not contain more than four shells.

These novel core/shell polymers are obtainable by multistage polymerization, preferably by emulsion polymerization in a plurality of stages.

Preferred polymers (B) which are prepared by emulsion polymerization in two stages are those in which a monomer mixture ($\alpha$) of $\alpha_1$) from 10 to 90, preferably from 30 to 70%, by weight of at least one conjugated diene, $\alpha_2$) from 10 to 90, preferably from 10 to 40%, by weight of at least one vinylaromatic monomer, $\alpha_3$) from 0 to 30, preferably from 10 to 30%, by weight of at least one di- or polyethylenically unsaturated monomers having at least one nonconjugated double bond and $\alpha_4$) from 0 to 30, preferably from 10 to 30%, by weight of at least one further monomer is used in stage ($\alpha$).

A monomer mixture ($\beta$) of $\beta_1$) from 10 to 70, preferably from 10 to 25%, by weight of at least one vinylaromatic monomer, $\beta_2$) from 30 to 90, preferably from 30 to 60%, by weight of a $C_1$–$C_{18}$-alkyl methacrylate, $\beta_3$) from 0 to 70, preferably from 30 to 60%, by weight of a $C_1$–$C_{18}$-alkyl acrylate, $\beta_4$) from 0 to 30, preferably from 10 to 30%, by weight of at least one nonconjugated double bond and $\beta_5$) from 0 to 30, preferably from 5 to 30%, by weight of at least one further monomer is preferably used in stage ($\beta$).

The amount by weight of the monomer mixture ($\alpha$) in the total polymer (B) is as a rule from 30 to 95, preferably from 30 to 70%, by weight. Since the amounts by weight of the monomers mixtures ($\alpha$) and ($\beta$) used in stages ($\alpha$) and ($\beta$) sum to 100% by weight, the amount by weight of monomer mixture ($\beta$) in the total polymer (B) is accordingly as a rule from 5 to 70, preferably from 30 to 70%, by weight.

Preferred polymers (B) which are prepared by emulsion polymerization in three stages are those in which a monomer mixture ($\gamma$) of $\gamma_1$) from 30 to 100, preferably from 30 to 60%, by weight of a vinylaromatic monomer, $\gamma_2$) from 0 to 70, preferably from 10 to 40%, by weight of at least one $C_1$–$C_{18}$-alkyl methacrylate, $\gamma_3$) from 0 to 70, preferably from 10 to 40%, by weight of at least one $C_1$–$C_{18}$-alkyl acrylate, $\gamma_4$) from 0 to 30, preferably from 10 to 30%, by weight of at least one di- or polyethylenically unsaturated monomer having at least one nonconjugated double bond and $\gamma_5$) from 0 to 30, preferably from 10 to 30%, by weight of at least one further monomer is used in the first stage ($\gamma$).

A monomer mixture ($\delta$) of $\delta_1$) from 10 to 90, preferably from 40 to 60%, by weight of at least one conjugated diene, $\delta_2$) from 10 to 90, preferably from 20 to 40%, by weight of at least one vinylaromatic monomer, $\delta_3$) from 0 to 30, preferably from 10 to 30%, by weight of at least one di- or polyethylenically unsaturated monomer having at least one nonconjugated double bond and $\delta_4$) from 0 to 30, preferably from 10 to 30%, by weight of at least one further monomer is preferably used in stage ($\epsilon$).

A monomer mixture ($\epsilon$) of $\epsilon_1$) from 10 to 80, preferably from 20 to 40%, by weight, of at least one vinylaromatic monomer, $\epsilon_2$) from 20 to 90, preferably from 30 to 50%, by weight of a $C_1$–$C_{18}$-alkyl methacrylate, $\epsilon_3$) from 0 to 70, preferably from 10 to 40%, by weight of at least one $C_1$–$C_{18}$-alkyl acrylate, $\epsilon_4$) from 0 to 30, preferably from 10 to 30%, by weight of at least one di- or polyethylenically unsaturated monomer having at least one nonconjugated double bond and $\epsilon_5$) from 0 to 30, preferably from 10 to 30%, by weight of at least one further monomer is preferably used in stage ($\epsilon$).

The amount by weight of monomer mixture ($\gamma$) in the total polymer (B) is as a rule from 3 to 95, preferably from 30 to 70%, by weight. The amount by weight of monomer mixture ($\delta$) in the total polymer (B) is as a rule from 2 to 70, preferably from 20 to 60%, by weight. Since the amounts by weight of the monomers mixtures ($\gamma$) to ($\epsilon$) used in stages ($\gamma$) to ($\epsilon$) sum to 100% by weight, the amount by weight of monomer mixture ($\epsilon$) in the total polymer (B) is accordingly as a rule from 5 to 95, preferably from 10 to 50%, by weight.

Suitable vinylaromatic monomers are styrene and its derivatives which are monosubstituted or polysubstituted in the nucleus, for example 4-methylstyrene, 4-ethylstyrene, 4-isopropylstyrene, 3,4-dimethylstyrene, 4-chlorostyrene, 4-bromostyrene and 3,4-dichlorostyrene.

Styrene is particularly preferred.

A particularly preferred conjugated diene is butadiene. Also suitable are, for example, isoprene and chloroprene.

Preferred alkyl methacrylates are $C_1$–$C_4$-alkyl methacrylates, in particular methyl methacrylate.

Among the alkyl acrylates, the $C_1$–$C_{12}$-alkyl acrylates, eg. methyl acrylate, ethyl acrylate, butyl acrylate, 2-ethylhexyl acrylate and lauryl acrylate, are particularly important.

Suitable crosslinking di- or polyethylenically unsaturated monomers having at least two isolated double bonds are, for example, allyl, methallyl and vinyl esters of dicarboxylic, tricarboxylic or higher carboxylic acids, eg. divinyl adipate, diallyl phthalate, diallyl maleate and diallyl fumarate; allyl, methallyl and vinyl ethers of polyfunctional alcohols, such as ethylene glycol divinyl ether, 1,3-butanediol divinyl ether, 1,4-butanediol divinyl ether and pentaerythritol triallyl ether; esters of acrylic or methacrylic acid with polyhydric alcohols, such as ethylene glycol di(meth)-acrylate, 1,2-propanediol di(meth)acrylate, 1,3-propanediol di(meth)acrylate, 1,3-butanediol di(meth)acrylate, 1,4- butanediol di(meth)acrylate or oligo- or polyethylene glycol di(meth)acrylate, divinylbenzene or mixtures of the stated substances. Diunsaturated monomers, in particular divinylbenzene as well as 1,3-butanediol di(meth)acrylate and 1,4-butanediol di(meth)acrylate, are preferred.

Further monomers may be, for example, vinyl ethers, such as vinyl isobutyl ether, and vinyl esters, such as vinyl acetate or vinyl propionate. However, it is also possible to use ethylenically unsaturated nitriles, such as acrylonitrile or methacrylonitrile. In stages ($\alpha$) and ($\delta$), further suitable monomers are the abovementioned alkyl (meth)acrylates.

The graft copolymers are prepared as stated above, preferably by emulsion polymerization.

The emulsifiers used are, for example, sodium, potassium, and ammonium salts of saturated or unsaturated $C_8$–$C_{20}$–fatty acids, such as lauric acid, stearic acid, palmitic acid or oleic acid, $C_8$–$C_{20}$–alkylsulfonic acids, $C_8$–$C_{20}$–alkylsulfates, alkylbenzenesulfonic acids, abietic acid and derivatives thereof, alkyl sulfosuccinates and alkylated phenoxyphenylsulfonic acids.

The particle size of the emulsion can be adjusted in a known manner by the choice of the type and amount of the emulsifier. It may be from 50 to 150 nm, preferably from 80 to 120 nm. Both the mechanical properties (impact strength) and the surface characteristics of the coatings obtainable from the synthetic resins are influenced by the particle size.

Water-soluble thermal initiators or redox systems may be used as initiators. Examples of suitable thermal initiators are sodium persulfate, potassium persul fate or ammonium persulfate and water-soluble azo compounds, such as the sodium salt of 4,4'-azobis-(4,4'-cyano-pentanoic acid). Examples of suitable redox systems are cumyl hydroperoxide, diisopropyl benzene hydroperoxide, tert-butyl hydroperoxide and tert-butyl peracetate in combination with reducing agents such as sodium formaldehyde sulfoxylate or ascorbic acid in the presence of iron salts. The stated persulfates can also be used in combination with reducing agents, such as sodium metabisulfite or potassium metabisulfite, in redox systems.

The polymerization temperature is in general from 10° to 100° C., preferably from 50° to 90° C.

The monomers of the first stage, for example ($\alpha$) or ($\delta$), are first polymerized. The monomers of the further stages, for example ($\beta$) or ($\gamma$) or ($\epsilon$), are then added to the aqueous emulsion. The monomers in the individual stages are polymerized to an extent of more than 50, preferably more than 70, particularly preferably more than 80%, by weight before the addition of the monomers of a further stage is begun.

The solids content of the emulsions is preferably from 20 to 70% by weight.

The polymer (B) can be isolated from the emulsion or dispersion in a known manner, for example by precipitation or spray drying or, as is preferred, can be further used in the form of the emulsion or dispersion.

Component C

The crosslinking agent which may be present in the synthetic resin as component (C) in general in an amount of from 0 to 50, preferably from 5 to 40%, by weight may be a blocked isocyanate crosslinking agent, or a transesterification, transamidation or transamination crosslinking agent. However, mixtures of different crosslinking agents may also be used. Crosslinking agent (C) may be a separate component of the synthetic resin. However, the molecules of the crosslinking agents may also be bound to the binder (A). Crosslinking agents may self-crosslinking binders is effected only when required, by establishing suitable conditions.

Examples of suitable blocked isocyanate crosslinking agents are polyoxyalkylene polyisocyanates having a very high content of polyoxyalkylene diisocyanate, aromatic diisocyanates, such as toluylene diisocyanate and aliphatic diisocyanates, such as trimerized hexamethylene diisocyanate. These may be blocked, for example with ketoximes or polyols.

Compounds which form transamidation crosslinking agents are compounds, preferably polyester resins, which contain free carboxyl groups capable of undergoing an addition reaction with carbalkoxymethyl groups. The carbalkoxymethyl esters react with free primary and/or secondary amino groups of the binders to form amides.

Binders which have hydroxyl groups as reactive centers can be cured, for example, by transesterification crosslinking agents. These crosslinking agents can be prepared, for example, by reacting epoxy resins based on bisphenol A and an epihalohydrin with a dicarboxylic acid in a first reaction step. In a second reaction step, these polyepoxide/dicarboxylic acid adducts can be reacted, for example, with glycolic esters, for example methyl glycolate, or with alkylene oxides, such as ethylene oxide or propylene oxide, or glycidyl esters of branched aliphatic carboxylic acids, in particular glycidyl versatate.

Mannich bases, which are reaction products of phenols, formaldehyde and secondary amines, can likewise be used as crosslinking component (C). For the preparation of these transamination crosslinking agents, for example, epoxy-carrying compounds, such as polyoxypropylene diglycidyl ethers, are reacted with polyhydric phenols, such as bisphenol A, and then with dialkylamines, such as dimethylamine, diethylamine or piperidine, and with formaldehyde or compounds which donate formaldehyde.

By means of appropriate reactions, additional hydroxyl, thio and/or amino groups can be introduced into the abovementioned crosslinking agents.

Component D

If desired, pigment formulations can be added to the synthetic resins. For example, the synthetic resins may contain preferably from 0 to 50, in particular from 5 to 40%, by weight of a pigment formulation consisting of one or more pigments and a resin having surfactant properties, ie. a grinding resin.

Examples of conventional pigments are iron oxides and lead oxides, strontium carbonate, carbon black, titanium dioxide, talc, barium titanate, cadmium yellow, cadmium red, chromium yellow, phthalocyanine blue or metallic pigments, such as aluminum flakes.

The resins of the formulation should have a high pigment-carrying capacity and should be compatible with the particular binder of the synthetic resin. Preferred grinding resins contain diglycidyl ethers based on bisphenol A and epichlorohydrin, which are modified by an amine, in particular an aliphatic diamine, such as hexamethylenediamine.

Component E

In addition, the novel synthetic resins may contain one or more additives, such as various fillers, antioxidants, UV absorbers, leveling agents, antifoams and other additives, for example polyvinyl ethers. These materials generally account for from 0 to about 10, in particular from 0 to 5%, by weight of the synthetic resin. The preferred fillers include aluminum silicate, aluminum sulfates and barium sulfate. Benzotriazoles and oxalic acid anilides have proven particularly good UV absorbers. Butylglycol and propylene glycol phenyl ether are examples of leveling agents. An antifoam effect is produced, for example, by fatty esters of butyne-1,4-diol or naphthenic mineral oils.

The individual components of the synthetic resin may each be present in solution in organic solvents. Suitable solvents are aromatic hydrocarbons, such as toluene and xylene, glycols, glycol ethers, such as diethylene glycol methyl ether, and alcohols.

The synthetic resin may be used in the form of a mixture of components or in the form of a solution thereof as a coating material for various substrates.

By adding acids, preferably carboxylic acids, such as formic, acetic or lactic acids, as well as inorganic acids, eg. phosphoric acid, the synthetic resins can be dispersed in water and can be applied by conventional methods to substrates consisting of wood, plastic and metal. However, it is preferable to protonate each of the components separately, to disperse them separately in water, if desired to strip off the organic solvent and then to mix the individual dispersions. Of course, it is also possible to add each of the additives to the individual components and then to carry out dispersing.

The novel synthetic resins are suitable in the form of aqueous dispersions for the electrocoating of electrically conductive articles, such as metal parts. For cathodic electrocoating, the solids content of the electrocoating bath is generally brought to 5–40, preferably 10–30%, by weight. Deposition is usually effected at from 15° to 40° C., preferably from 20° to 35° C., in the course of from 1 to 5 minutes and at a pH of from 5 to 8, preferably at neutral pH, at from 50 to 500 V, preferably from 150 to 450 V. The electrically conductive article to be coated is made the cathode. The deposited film is cured at from about 100° to about 200° C. for from about 10 to about 30 minutes.

The coatings obtainable using the novel synthetic resins have a very good stonechip resistance in conjunction with very good corrosion resistance. The coatings obtainable in this manner are also smooth.

EXAMPLES

Preparation of the Polymers (B)

I) Polymers having a Core and One Shell

General Method for the Polymers ($B_1$) to ($B_{10}$)

0.5 g of $C_{14}/C_{15}$-paraffinsulfonate (for example emulsifier K 30 from Bayer AG) was added to 600 g of demineralised water and the mixture was heated to 70° C. A mixture of 1.3 g of peroxodisulfate and amounts of butadiene and styrene which are shown in Table 1 were metered in over one hour and the mixture was kept at 70° C. for a further 4 hours.

The acrylates stated in Table I were then mixed with 0.8 g of peroxodisulfate and were then metered in over 30 minutes. Stirring was continued for a further 3–4 hours at 70° C.

The emulsified polymer thus obtained was added to the binder described below.

TABLE I

| | Polymers ($B_1$) to ($B_{10}$) having a core and one shell | | | | | | | |
|---|---|---|---|---|---|---|---|---|
| | Monomers | | | | | | | |
| Example No. | Butadiene [g] | Styrene [g] | MMA$^{(1)}$ [g] | EA$^{(2)}$ [g] | DMAEA$^{(3)}$ [g] | DEAEA$^{(4)}$ [g] | HEA$^{(5)}$ [g] | HPA$^{(6)}$ [g] |
| $B_1$ | 252 | 168 | 180 | — | — | — | — | — |
| $B_2$ | 270 | 180 | — | 132 | 18 | — | — | — |
| $B_3$ | 288 | 192 | — | 100 | — | 20 | — | — |
| $B_4$ | 270 | 180 | — | 120 | 15 | — | 15 | — |
| $B_5$ | 288 | 192 | — | 80 | — | 25 | — | 15 |
| $B_6$ | 315 | 105 | 180 | — | — | — | — | — |
| $B_7$ | 337 | 112 | — | 132 | 18 | — | — | — |
| $B_8$ | 360 | 120 | — | 100 | — | 20 | — | — |
| $B_9$ | 315 | 105 | — | 120 | 15 | — | 15 | — |
| $B_{10}$ | 360 | 120 | — | 80 | — | 25 | — | 15 |

$^{(1)}$MMA: Methyl methacrylate
$^{(2)}$EA: Ethyl acrylate
$^{(3)}$DMAEA: Dimethylaminoethyl acrylate
$^{(4)}$DEAEA: Diethylaminoethyl acrylate
$^{(5)}$HEA: Hydroxyethyl acrylate
$^{(6)}$HPA: Hydroxypropyl acrylate II) Polymers having a Core and Two Shells General Method for the Polymers ($B_{11}$) to ($B_{20}$)

A mixture of 600 g of demineralised water and 0.5 g of $C_{14}/C_{15}$-paraffinsulfonate (for example emulsifier K 30 from Bayer AG) was heated to 70° C., 20 g of styrene were added and stirring was carried out for 30 minutes. 0.9 g of peroxodisulfate was then added and stirring was continued for about a further 2 hours.

A mixture of 1.1 g of peroxodisulfate and amounts of butadiene and styrene as shown in Table II was metered into the resulting core in the course of one hour. Stirring was continued for about a further 4 hours at from 70° to 80° C.

The acrylates shown in Table II were then mixed with 0.9 g of peroxodisulfate and the mixture was metered in over 30 minutes. Stirring was continued for about a further 3–4 hours at 80° C.

The emulsified polymer thus obtained was added to the binder described below.

TABLE II

| | Polymer (B) having a core and two shells | | | | | | | | |
|---|---|---|---|---|---|---|---|---|---|
| Example No. | Styrene [g] | Butadiene [g] | Styrene [g] | MMA$^{(1)}$ [g] | EA$^{(2)}$ [g] | DMAEA$^{(3)}$ [g] | DEAEA$^{(4)}$ [g] | HEA$^{(5)}$ [g] | HPA$^{(6)}$ [g] |
| $B_{11}$ | 20 | 216 | 144 | 210 | — | — | — | — | — |
| $B_{12}$ | 20 | 252 | 168 | — | 92.4 | 18 | — | — | — |
| $B_{13}$ | 20 | 234 | 156 | — | 150 | — | 30 | — | — |

TABLE II-continued

| | Polymer (B) having a core and two shells | | | | | | | | |
|---|---|---|---|---|---|---|---|---|---|
| Example | | | | Monomers | | | | | |
| No. | Styrene [g] | Butadiene [g] | Styrene [g] | MMA[(1)] [g] | EA[(2)] [g] | DMAEA[(3)] [g] | DEAEA[(4)] [g] | HEA[(5)] [g] | HPA[(6)] [g] |
| $B_{14}$ | 20 | 252 | 168 | — | 92.4 | 9 | — | 9 | — |
| $B_{15}$ | 20 | 234 | 156 | — | 150 | — | 20 | — | 10 |
| $B_{16}$ | 20 | 270 | 90 | 210 | — | — | — | — | — |
| $B_{17}$ | 20 | 315 | 105 | — | 92.4 | 18 | — | — | — |
| $B_{18}$ | 20 | 292.5 | 97.5 | — | 150 | — | 30 | — | — |
| $B_{19}$ | 20 | 315 | 105 | — | 92.4 | 9 | — | 9 | — |
| $B_{20}$ | 20 | 292.5 | 97.5 | — | 150 | — | 20 | — | 10 |

[(1)-(6)]See legend for Table (I)

III) Preparation of the Binder 960 g of a diglycidyl ether based on bisphenol A and having an epoxide equivalent weight of about 490, 110 g of nonylphenol and 56 g of phenoxypropanol were heated to 130° C. while stirring. 1.1 g of dimethylbenzylamine were added and the reaction was allowed to continue until the epoxide equivalent weight was 1040. Dilution was effected with 403 g of a solvent mixture consisting of isobutanol and butylglycol (weight ratio 9:1) and the mixture was cooled to 60° C. Thereafter, methylethanolamine was added dropwise and the reaction was allowed to continue for a further 10 minutes. 98.2 g of the amidoamine (see below) and 41 g of a 9:1 isobutanol/butylglycol mixture were then added. The temperature was maintained at 80° C. for a further 2 hours. Solids content: 70.1% by weight; amine number: 50.8 mg of KOH/g.

Amidoamine 290 g of hexamethylenediamine, 218 g of a dimeric fatty acid (eg. Pripol 1014, Unichema), 70 g of linoleic acid (eg. Nouracid LE80, Akzo) and 31 g of xylene were heated to 190° C. and 48 g of a mixture of water of reaction and xylene were distilled off azeotropically. Dilution was effected with 92 g of xylene. A further 7 g of hexamethylenediamine were then added. The amine number of the product was 350 mg of KOH and the acid number was 1.8 mg of KOH/g.

IV) Preparation of the Pigment Formulation 660.8 g of a bisphenol A diglycidyl ether having an epoxide equivalent weight of 190 (eg. epoxy resin EPON 828 from Shell) were mixed with 260.6 g of bisphenol A and 61.5 g of dodecylphenol and the mixture was heated at 110° C. until a clear solution had formed. 0.98 g of ethyltriphenylphosphonium iodide was then added, after which the temperature increased to 150° C. After the exothermic reaction had ceased, the mixture was kept at 130° C. for 90 minutes. It was then diluted with 513.5 g of 2-butoxyethanol and cooled to 80° C., after which 244.2 g of thiodiethanol (50% active) were added dropwise in the course of 30 minutes. 134.2 g of thiodiethanol (50% active) were then added dropwise. 134.1 g of dimethylolpropionic acid and 30.6 g of water were then added. 98 g of this resin were stirred with 175 g of titanium dioxide, 8 g of lead silicate, 35 g of aluminum silicate, 11 g of dibutyltin oxide, 3.5 g of beaded black and 169.5 g of water to give a paste.

V) Preparation of the Electrocoating Baths 332 g of one of the novel polymers (B) obtained above and 698 g of the pigment paste were added to 1780 g of binder dispersion and the mixture was made up to 5000 g with demineralised water. The polymer solids content in each case was 10% by weight, based on the total solids content of the electrocoating finishes. The electrocoating baths were stirred for 7 days at 30° C. Synthetic resin films having a thickness of from 22 to 24 μm were deposited on test panels which were made the cathode, measured 190×150 mm and consisted of zinc phosphated steel sheet, at from 150 to 500 V in the course of 2 minutes at a bath temperature of 27° C. The synthetic resin films were then baked at 165° C. in the course of 20 minutes.

The compositions of the baths and the test results are listed in Table III.

TABLE III

| Electrocoating bath No. | Polymer | Leveling | EC [mm] | RI [Nm] | DB(−) [mm$^2$/degree of rusting] | ET U/S/E [mm] |
|---|---|---|---|---|---|---|
| According to the invention | | | | | | |
| 1 | B1 | 4 | 7.9 | 6.8 | 7.5/4 | 1.3/1/3 |
| 2 | B2 | 3 | 8.1 | 9.1 | 6.1/4 | 1.4/1/3 |
| 3 | B3 | 2 | 8.0 | 13.6 | 5.0/3 | 1.5/1/2 |
| 4 | B4 | 2 | 8.9 | 18.1 | 3.5/2 | 1.1/0/1 |
| 5 | B5 | 1 | 9.5 | >18.1 | 2.5/1 | 1.1/0/1 |
| 6 | B6 | 4 | 6.9 | 9.1 | 7.6/3 | 1.4/1/3 |
| 7 | B7 | 3 | 7.5 | 11.3 | 6.0/3 | 1.3/1/2 |
| 8 | B8 | 3 | 7.6 | 13.6 | 5.8/3 | 1.6/2/3 |
| 9 | B9 | 2 | 7.4 | 15.8 | 6.1/2 | 1.2/1/2 |
| 10 | B10 | 2 | 8.1 | 18.1 | 5.3/1 | 1.3/0/1 |
| 11 | B11 | 4 | 6.6 | 4.5 | 8.1/4 | 1.4/1/3 |
| 12 | B12 | 4 | 6.9 | 6.8 | 7.2/3 | 1.1/1/1 |
| 13 | B13 | 2 | 8.0 | 11.3 | 5.0/2 | 1.3/1/2 |
| 14 | B14 | 2 | 8.2 | 15.8 | 4.2/2 | 1.6/1/3 |
| 15 | B15 | 2 | 8.8 | 18.1 | 3.9/1 | 1.1/1/1 |
| 16 | B16 | 3 | 6.9 | 4.5 | 7.6/3 | 1.7/0/3 |
| 17 | B17 | 3 | 7.1 | 9.1 | 6.1/2 | 1.3/1/2 |
| 18 | B18 | 2 | 7.9 | 13.6 | 5.9/2 | 1.2/0/2 |
| 19 | B19 | 2 | 8.1 | 15.8 | 5.1/2 | 1.4/1/1 |
| 20 | B20 | 2 | 8.5 | 18.1 | 4.6/1 | 1.6/1/1 |
| For comparison | | | | | | |

TABLE III-continued

| Electrocoating bath No. | Polymer | Leveling | EC [mm] | RI [Nm] | DB(—) [mm²/degree of rusting] | ET U/S/E [mm] |
|---|---|---|---|---|---|---|
| C1 | — | 3 | 4.9 | <1.1 | 13.7/5 | 2.2/2/5 |

Leveling: Quality of leveling in ratings 1 (very good leveling) to 5 (very poor leveling)
EC: Eriksen cupping
RI: Reverse impact; determination using a mandrel impact tester from Gardner, according to ASTM D 2794
DB(—): Mercedes-Benz individual stonechip test at a test temperature of −20° C.; DIN 55,995, Method A; Erichsen Technical Description Model 490 (1981); degrees of rusting 0 (no rust) to 5 (very severe rusting)
ET: Environmental test, 10 cycles; undermigration U in mm; surface rust S and edge rust E in ratings 0 (no rust) to 5 (very severe rusting)

We claim:

1. A cathodic electrocoating bath comprising a pigment paste and an aqueous dispersion containing from 5 to 50% by weight of a synthetic resin consisting essentially of:
   A) from 20 to 95% by weight of an epoxy resin binder reacted with a saturated or unsaturated primary and/or secondary amine;
   B) from 5 to 80% by weight of an emulsion polymer component which contains a core and one shell, which component is obtained by two-stage emulsion polymerization wherein a monomer mixture ($\alpha$) of
      $\alpha_1$) from 10 to 90% by weight of at least one conjugated diene,
      $\alpha_2$) from 10 to 90% by weight of at least one vinylaromatic monomer.
      $\alpha_3$) from 0 to 30% by weight of at least one di- or polyethylenically unsaturated monomers having at least one nonconjugated double bond and
      $\alpha_4$) from 0 to 30% by weight of at least one further monomer is prepared by emulsion polymerization in stage ($\alpha$); and a monomer mixture ($\beta$) of
      $\beta_1$) from 10 to 70% by weight of at least one vinylaromatic monomer,
      $\beta_2$) from 30 to 90% by weight of a $C_1$-$C_{18}$-alkyl methacrylate,
      $\beta_3$) from 0 to 70% by weight of a $C_1$-$C_{18}$-alkyl acrylate,
      $\beta_4$) from 0 to 30% by weight of a monomer containing at least one nonconjugated double bond and
      $\beta_5$) from 0 to 30% by weight of at least one further monomer is subsequently subjected to emulsion polymerization in stage ($\beta$) in the presence of the polymer obtained in stage ($\alpha$); the amount by weight of the monomer mixture ($\alpha$) in the total polymer (B) is from 30 to 95% by weight, and the amount by weight of monomer mixture ($\beta$) in the total polymer (B) is from 5 to 70% by weight;
   C) from 0 to 50% by weight of one or more crosslinking agents;
   D) from 0 to 50% by weight of a pigment formulation consisting of one or more pigments and a resin having surfactant properties; and
   E) from 0 to 10% by weight of additives and/or assistants.

2. A cathodic electrocoating bath comprising a pigment paste and an aqueous dispersion containing from 5 to 50% by weight of a synthetic resin consisting essentially of:
   A) from 20 to 95% by weight of crosslinkable binders which are polymers, polyadducts or polycondensates having reactive centers in the form of hydroxyl, thio or primary or secondary amino groups or hydrophilic centers in the form of ammonium, sulfonium or phosphonium groups;
   B) from 5 to 80% by weight of a polymer component which contains a core and two shells, which component is obtained by three-stage emulsion polymerization wherein a monomer mixture ($\gamma$) of
      $\gamma_1$) from 30 to 100% by weight of a vinylaromatic monomer,
      $\gamma_2$) from 0 to 70% by weight of at least one $C_1$-$C_{18}$-alkyl methacrylate,
      $\gamma_3$) from 0 to 70% by weight of at least one $C_1$-$C_{18}$-alkyl acrylate,
      $\gamma_4$) from 0 to 30% by weight of at least one di- or polyethylenically unsaturated monomer having at least one nonconjugated double bond and
      $\gamma_5$) from 0 to 30% by weight of at least one further monomer is subjected to emulsion polymerization in the first stage ($\gamma$); a monomer mixture ($\delta$) of
      $\delta_1$) from 10 to 90% by weight of at least one conjugated diene,
      $\delta_2$) from 10 to 90% by weight of at least one vinylaromatic monomer,
      $\delta_3$) from 0 to 30% by weight of at least one di- or polyethylenically unsaturated monomer having at least one nonconjugated double bond and
      $\delta_4$) from 0 to 30% by weight of at least one further monomer is subsequently subjected to emulsion polymerization in stages ($\delta$) in the presence of the emulsion polymer obtained in stage ($\gamma$); a monomer of mixture of ($\epsilon$) of
      $\epsilon_1$) from 10 to 80% by weight, of at least one vinylaromatic monomer,
      $\epsilon_2$) from 20 to 90% by weight of a $C_1$-$C_{18}$-alkyl methacrylate,
      $\epsilon_3$) from 0 to 70% by weight of at least one $C_{1-C18}$-alkyl acrylate,
      $\epsilon_4$) from 0 to 30% by weight of at least one di- or polyethylenically unsaturated monomer having at least one nonconjugated double bond and
      $\epsilon_5$) from 0 to 30% by weight of at least one further monomer is subsequently subjected to emulsion polymerization in stage ($\epsilon$) in the presence of the emulsion polymer obtained in stage ($\delta$); the amount by weight of monomer mixture ($\gamma$) in the total polymer (B) is from 3 to 95% by weight, the amount by weight of monomer mixture ($\delta$) in the total polymer (B) is from 2 to 70% by weight, and the amount by weight of monomer mixture ($\epsilon$) in the total polymer (B) is from 5 to 95% by weight;
   C) from 0 to 50% by weight of one or more crosslinking agents;
   D) from 0 to 50% by weight of a pigment formulation consisting of one or more pigments and a resin having surfactant properties; and
   E) from 0 to 10% by weight of additives and/or assistants.

3. A cathodic electrocoating bath comprising a pigment paste and an aqueous dispersion containing from 5 to 50% by weight of a synthetic resin consisting essentially of:
- A) from 20 to 95% by weight of crosslinkable binders which are polymers, polyadducts or polycondensates having reactive centers in the form of hydroxyl, thio or primary or secondary amino groups or hydrophilic centers in the form of ammonium, sulfonium or phosphonium groups;
- B) from 5 to 80% by weight of a polymer component which contains a core and one shell, which component is obtained by two-stage emulsion polymerization wherein a first monomer component contains from 10 to 90% by weight based on the first component of butadiene and from 10–90% by weight based on the first component of styrene is subjected to emulsion polymerization in stage 1; and a second monomer component at least one member selected from the group consisting of methyl methacrylate, ethyl acrylate, dimethylaminoethyl acrylate, diethylaminoethyl acrylate, hydroxyethyl acrylate and hydroxypropyl acrylate is subsequently subjected to emulsion polymerization in stage 2 in the presence of the polymer obtained in stage 1; the amount by weight of the first monomer component in the total polymer B) is from 30 to 95% by weight, and the amount of the second monomer component in the total polymer B is from 5 to 70% by weight;
- C) from 0 to 50% by weight of one or more crosslinking agents;
- D) from 0 to 50% by weight of a pigment formulation consisting of one or more pigments and a resin having surfactant properties; and
- E) from 0 to 10% by weight of additives and/or assistants.

4. A cathodic electrocoating bath comprising a pigment paste and an aqueous dispersion containing from 5 to 50% by weight of a synthetic resin consisting essentially of:
- A) from 20 to 95% by weight of crosslinkable binders which are polymers, polyadducts or polycondensates having reactive centers in the form of hydroxyl, thio or primary or secondary amino groups or hydrophilic centers in the form of ammonium, sulfonium or phosphonium groups;
- B) from 5 to 80% by weight of a polymer component which contains a core and two shells, which component is obtained by three-stage emulsion polymerization wherein
  - a first monomer component containing styrene is subjected to emulsion polymerization in stage 1;
  - a second monomer component containing a mixture of from 10 to 90% by weight butadiene and from 10 to 90% by weight styrene is subsequently subjected to emulsion polymerization in stage 2 in the presence of the emulsion polymer obtained in stage 1; and
  - a third monomer component containing at least one member selected from the group consisting of methyl methacrylate, ethyl acrylate, dimethylaminoethyl acrylate, diethylaminoethyl acrylate, hydroxyethyl acrylate and hydroxypropyl acrylate is subsequently subjected to emulsion polymerization in stage 3 in the presence of the emulsion polymer obtained in stage 2; the amount by weight of the first monomer component in the total polymer B) is from 3 to 95% by weight, the amount of the second monomer components in the total polymer B is from 2 to 70% by weight, and the amount of the thrid monomer component in the total polymer B) is from 5 to 95% by weight;
- C) from 0 to 50% by weight of one or more crosslinking agents;
- D) from 0 to 50% by weight of a pigment formulation consisting of one or more pigments and a resin having surfactant properties; and
- E) from 0 to 10% by weight of additives and/or assistants.

5. A cathodic electroplating bath as recited in claim 1, wherein said amine is selected from the group consisting of alkylamine, alkyalkanoamine, polyoxyalkylenepolyamine and polyhydric polyolefinamine.

* * * * *

UNITED STATES PATENT AND TRADEMARK OFFICE
CERTIFICATE OF CORRECTION

PATENT NO.: 5,446,084

DATED: August 29, 1995

INVENTOR(S): HUEMKE et al.

It is certified that error appears in the above-identified patent and that said Letters Patent is hereby corrected as shown below:

Column 13, claim 3, line 17, after "component" insert --containing--.

Column 14, claim 4, line 26, "components" should read --component--.

Column 14, claim 4, line 28, "thrid" should read --third--.

Signed and Sealed this

Twelfth Day of December, 1995

Attest:

Attesting Officer

BRUCE LEHMAN

Commissioner of Patents and Trademarks